US009843553B2

(12) United States Patent
Rui et al.

(10) Patent No.: US 9,843,553 B2
(45) Date of Patent: Dec. 12, 2017

(54) METHOD AND DEVICE FOR SENDING MESSAGE

(71) Applicant: ZTE Corporation, Shenzhen (CN)

(72) Inventors: Tong Rui, Shenzhen (CN); Zhenwu Hao, Shenzhen (CN); Mo Sun, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 43 days.

(21) Appl. No.: 15/029,367

(22) PCT Filed: May 28, 2014

(86) PCT No.: PCT/CN2014/078697
§ 371 (c)(1),
(2) Date: Apr. 14, 2016

(87) PCT Pub. No.: WO2014/177101
PCT Pub. Date: Nov. 6, 2014

(65) Prior Publication Data
US 2016/0261553 A1 Sep. 8, 2016

(30) Foreign Application Priority Data
Oct. 29, 2013 (CN) .......................... 2013 1 0521769

(51) Int. Cl.
*H04L 29/12* (2006.01)
*H04L 12/701* (2013.01)
*H04L 12/46* (2006.01)

(52) U.S. Cl.
CPC ........ *H04L 61/103* (2013.01); *H04L 12/4633* (2013.01); *H04L 45/00* (2013.01); *H04L 61/6004* (2013.01)

(58) Field of Classification Search
CPC ... H04L 45/00; H04L 61/103; H04L 12/4633; H04L 61/6004
See application file for complete search history.

(56) References Cited

U.S. PATENT DOCUMENTS 9,686,256 B2* 6/2017 Yan .................... H04L 63/08
2008/0165738 A1* 7/2008 Barber ................ H04W 80/04
370/331

(Continued)

FOREIGN PATENT DOCUMENTS

CN 102025606 A 4/2011
CN 102238059 A 11/2011

(Continued)

OTHER PUBLICATIONS

International Search Report for corresponding application PCT/CN2014/078697 filed on May 28, 2014; dated Jul. 25, 2014.

*Primary Examiner* — Khaled Kassim
*Assistant Examiner* — Syed S Ali
(74) *Attorney, Agent, or Firm* — Cantor Colburn LLP

(57) ABSTRACT

Provided are a method and device for sending message. The method includes that: a mapping table is established; a message is received from a receiver; the mapping table is searched to obtain a Route Identification (RID) of an Access Service Node (ASN) of a sender corresponding to the message according to the message; and the message is sent to the ASN according to the found RID of the ASN. By the technical solution, the problem of non-uniformity of access manners for uplink and downlink data streams in a related technology is solved, and a proper access manner can be selected for the downlink data stream.

12 Claims, 6 Drawing Sheets

(56) References Cited

U.S. PATENT DOCUMENTS

| | | | | |
|---|---|---|---|---|
| 2008/0212529 | A1* | 9/2008 | Kim | H04W 72/005 |
| | | | | 370/329 |
| 2012/0176936 | A1* | 7/2012 | Wu | H04W 8/26 |
| | | | | 370/254 |
| 2012/0278874 | A1* | 11/2012 | Yan | H04L 61/103 |
| | | | | 726/7 |
| 2012/0284407 | A1* | 11/2012 | Yan | H04L 63/08 |
| | | | | 709/225 |
| 2012/0320876 | A1* | 12/2012 | Zhou | H04W 36/12 |
| | | | | 370/331 |
| 2013/0125246 | A1* | 5/2013 | Yan | H04L 63/08 |
| | | | | 726/28 |
| 2013/0262672 | A1* | 10/2013 | Sun | H04L 43/04 |
| | | | | 709/224 |

FOREIGN PATENT DOCUMENTS

| CN | 102547908 A | 7/2012 |
|---|---|---|
| CN | 103209131 A | 7/2013 |

* cited by examiner

METHOD AND DEVICE FOR SENDING MESSAGE

TECHNICAL FIELD

The present disclosure relates to the field of communication, and in particular to a method and device for sending a message.

BACKGROUND

An Internet Protocol (IP) address in Transport Control Protocol (TCP)/IP widely used for the Internet at present has dual functions, it may serve, in a network layer, as a locator of a network interface of a communication terminal host in network topology, and may serve, in a transport layer, as an identifier of a network interface of a host. Along with the development of a mobile network, when mobile hosts become increasingly popular, defects of the dual functions of such an IP address become increasingly obvious, and directly influence routing extensibility of the Internet and continuity of communication services. An identifier and locator separation technology aims to solve the problem of semantic ambiguity of the IP address. FIG. 1 is a network architecture of a system based on the identifier and locator separation technology in a related technology. A Subscriber Identifier and Locator Separation Network (SILSN) is shown in FIG. 1. In FIG. 1, the SILSN consists of an Access Service Node (ASN), User Equipment (abbreviated as UE, also referred to as Terminal), an Identification and Locator Register (ILR) and the like. The UE accesses the ASN through an access network. The ASN is responsible for accessing the UE to the Internet, and functions in charging, handover and the like. The ILR functions in location registration and query of a user and the like.

In an SILSN, an Access Identification (AID) is taken as an identifier of UE, and a Route Identification (RID) is taken as a locator of the UE, which is actually an identifier of an ASN that the UE accesses, so that each piece of UE accessing the SILSN has its own AID and RID.

When UE accesses an SILSN, its location, i.e. the ASN which the UE accesses, is registered to an ILR through the ASN at first, and the ILR establishes, after the registration of the UE, a corresponding relationship (AID,RID) between an AID of the UE and an RID of the ASN that the UE accesses. If UE1 needs to communicate with UE2, UE1 structures a data message by taking its own identifier AID1 as a source address and taking an identifier of UE2 as a destination address and sends the constructed data message. Afterwards, ASN1 queries a location of UE2, i.e. the ASN (e.g., ASN9 in FIG. 1) which UE2 accesses, to an ILR, then the ASN1 sends the data message to the corresponding ASN9, and the ASN9 processes and sends the message to UE2.

The abovementioned network successfully realizes the separation of an identifier and locator of UE, and the identifier is not required to be changed when a user moves and roams, so that the continuity of a service in a mobile process is ensured. In addition, since routing is implemented in the network according to RIDs of ASNs, and the number of the ASNs is greatly reduced compared with that required when original IP address prefixes are adopted, the routing extensibility of the network is improved.

Along with the enhancement of terminal capability and the development of access technologies, multiple network access manners are gradually utilized at the same time. For example, some terminals may simultaneously adopt a Long-Term Evolution (LTE) manner, a Wireless Local Area Network (WLAN) manner and the like for network access to meet requirements of different scenarios and different services. Under such a condition, a different AID may be allocated to each access manner of each terminal, that is, the same user adopt different user identifiers for access, but by such a method, a user requirement on user identifier uniqueness cannot be met to further meet requirements of network management and Internet services.

The characteristic of user uniqueness may be beneficial to user network security and service application. For example, an Internet management department may conveniently manage, for example, monitor, trace and interrupt, a network behaviour of a user according to a unique identifier of the user, and an Internet service may also acquire service subscription data of the user by virtue of the unique user identifier to realize operation such as single sign-on.

For the abovementioned reasons, it is necessary to improve the SILSN to enable a user to access the network by virtue of a unique user identifier during multiple access and select a proper access manner according to a service characteristic, so as to fully utilize advantages in terms of network security and services brought by use of the unique user identifier in the SILSN to meet a development requirement of a multiple access technology.

FIG. 2 is a diagram of a specific scenario of multiple access in the related technology. As shown in FIG. 2, when a user accesses a network by adopting multiple access manners, in order to keep an AID of the user unique, the AID should be kept unchanged, UE1 accesses different ASNs through different access networks using the same AID, and different ASNs have different RIDs, that is, the same AID may simultaneously correspond to different RIDs. When UE1 receives or sends a data stream, it is necessary to select a proper access manner according to a service characteristic and an access network property, and such a requirement is for an uplink data stream (which is sent to opposite UE by local UE through a network) as well as a downlink data stream (which is sent to the local UE by the opposite UE through the network). For example, for data streams of the same service, the same access manner is generally required to be selected for both uplink and downlink. An access manner for an uplink data stream is generally selected by local UE according to a local strategy or a strategy of the access network, and once an access network is selected, a corresponding ASN is selected. For a downlink data stream, it can be seen from FIG. 2 that the access manner is selected by an opposite ASN, and when the opposite ASN selects a locator of UE, i.e. an ASN which the UE accesses, the access manner is selected. In an example shown in FIG. 2, since the entity for selecting the access manner for uplink data stream is inconsistent with the one for selecting the access manner for downlink data stream, different access manners may be selected for uplink and downlink data streams. How to ensure that proper access manners can be selected for uplink and downlink data streams, especially for the downlink data stream, is a problem required to be emphatically solved in a multiple access scenario.

For the problem of non-uniformity of access manners for uplink and downlink data streams in the related technology, there is yet no solution.

SUMMARY

The embodiments of the present disclosure provide a method and device for sending message, so as to at least solve the problem of non-uniformity of access manners for uplink and downlink data streams in the related technology.

According to one aspect of the embodiments of the present disclosure, a method for sending a message is provided, which includes that: a mapping table is established, wherein the mapping table includes a corresponding relationship at least between an RID of an ASN of a sender and an AID, and the AID includes an AID of the sender and an AID of a receiver; a message is received from the receiver; the mapping table is searched according to the message to obtain the RID of the ASN of the sender corresponding to the message; and the message is sent to the ASN according to the found RID of the ASN.

In an example embodiment, an ASN of the receiver receives a message from the sender through the ASN of the sender, extracts the AID of the sender, the AID of the receiver and the RID of the ASN of the sender from the message of the sender, and establishes the corresponding relationship; the ASN of the receiver receives a message from the receiver; the ASN of the receiver searches the mapping table for the RID of the ASN of the sender corresponding to the message of the receiver according to the message of the receiver; and the ASN of the receiver sends the message of the receiver to the ASN of the sender according to the found RID of the ASN of the sender.

In an example embodiment, a first ASN corresponding to the sender receives a message from the sender through a second ASN corresponding to the sender, extracts the AID of the sender, the AID of the receiver and an RID of the second ASN from the message of the sender, and establishes the corresponding relationship; the first ASN receives a message from the receiver; the first ASN searches the mapping table for the RID of the second ASN corresponding to the message of the receiver according to the message of the receiver; and the first ASN sends the message of the receiver to the second ASN according to the found RID of the second ASN.

In an example embodiment, before the first ASN receives the message from the sender through the second ASN, the method further includes that: the first ASN receives a notification from a network side, wherein the notification is used for indicating that the first ASN is a primary ASN; and the first ASN initiates establishment of a tunnel to the second ASN according to the RID of the second ASN carried in the notification, wherein the tunnel is used for interaction between the first ASN and the second ASN.

In an example embodiment, before the first ASN receives the message from the sender through the second ASN, the method further includes that: the first ASN and the second ASN receive a notification from the network side, and the first ASN and the second ASN establish a tunnel, wherein the tunnel is used for interaction between the first ASN and the second ASN; and the first ASN and the second ASN negotiate about a primary and secondary relationship between the first ASN and the second ASN, and return a negotiation result to the network side.

In an example embodiment, the corresponding relationship is a corresponding relationship between the RID of the ASN of the sender, the AID and a port number, wherein the port number includes a port number of the receiver and/or a port number of the sender.

According to the other aspect of the embodiments of the present disclosure, a device for sending a message is further provided, which includes: an establishment component, configured to establish a mapping table, wherein the mapping table includes a corresponding relationship at least between an RID of an ASN of a sender and an AID, and the AID includes an AID of the sender and an AID of a receiver; a receiving component, configured to receive a message from the receiver; a searching component, configured to search the mapping table for the RID of the ASN of the sender corresponding to the message according to the message; and a sending component, configured to send the message to the ASN according to the found RID of the ASN.

In an example embodiment, the device is located in an ASN of the receiver, and the establishment component is configured to receive a message from the sender through the ASN of the sender, extract the AID of the sender, the AID of the receiver and the RID of the ASN of the sender from the message of the sender, and establish the corresponding relationship; the receiving component is configured to receive a message from the receiver; the searching component is configured to search the mapping table for the RID of the ASN of the sender corresponding to the message of the receiver according to the message of the receiver; and the sending component is configured to send the message of the receiver to the ASN of the sender according to the found RID of the ASN of the sender.

In an example embodiment, the device is located in a first ASN corresponding to the sender, and the establishment component is configured to receive a message from the sender through a second ASN corresponding to the sender, extract the AID of the sender, the AID of the receiver and an RID of the second ASN from the message of the sender, and establish the corresponding relationship; the receiving component is configured to receive a message from the receiver; the searching component is configured to search the mapping table for the RID of the second ASN corresponding to the message of the receiver according to the message of the receiver; and the sending component is configured to send the message of the receiver to the second ASN according to the found RID of the second ASN.

In an example embodiment, the corresponding relationship is a corresponding relationship between the RID of the ASN of the sender, the AID and a port number, wherein the port number includes a port number of the receiver and/or a port number of the sender.

By the embodiments of the present disclosure, the mapping table is established, and the message is received from the receiver; the mapping table is searched according to the message to obtain the RID of the ASN of the sender corresponding to the message; and the message is sent to the ASN according to the found RID of the ASN. By virtue of the above solution, the problem of non-uniformity of access manners for uplink and downlink data streams in the related technology is solved, and a proper access manner can be selected for the downlink data stream.

BRIEF DESCRIPTION OF THE DRAWINGS

The drawings described here are adopted to provide further understanding of the present disclosure, and form a part of the present disclosure, and schematic embodiments of the present disclosure and description thereof are adopted to explain the present disclosure and not intended to improperly limit the present disclosure. In the drawings.

DETAILED DESCRIPTION OF THE EMBODIMENTS

It is important to note that embodiments in the present disclosure and characteristics in the embodiments may be combined under the condition of no conflicts. The present disclosure is described below with reference to the drawings and the embodiments in detail.

Figure 1:
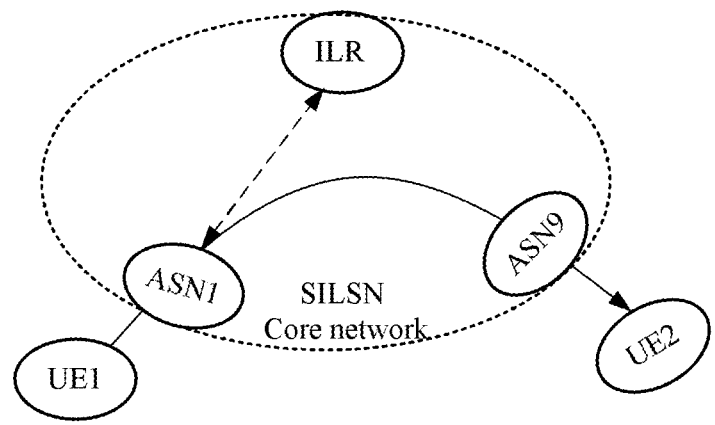
FIG. 1 is a network architecture of a system based on the identifier and locator separation technology in the related technology.
Figure 2:
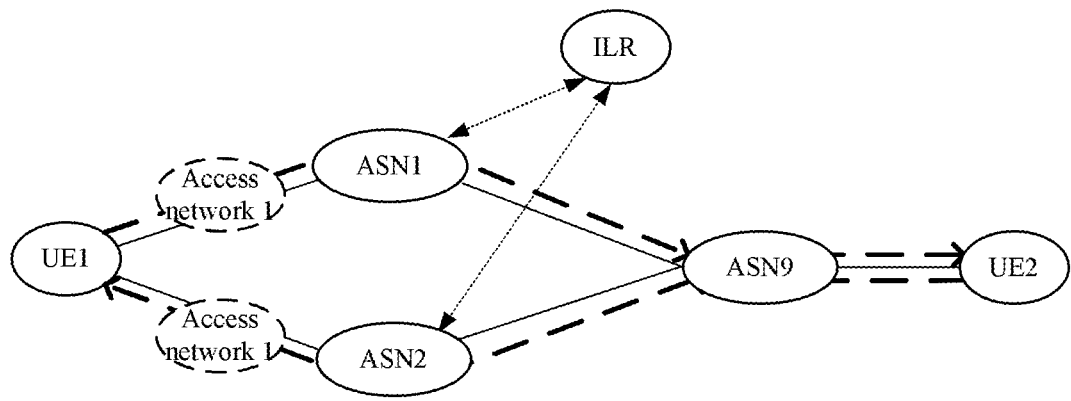
FIG. 2 is a diagram of a specific scenario of multiple access in the related technology.
Figure 3:
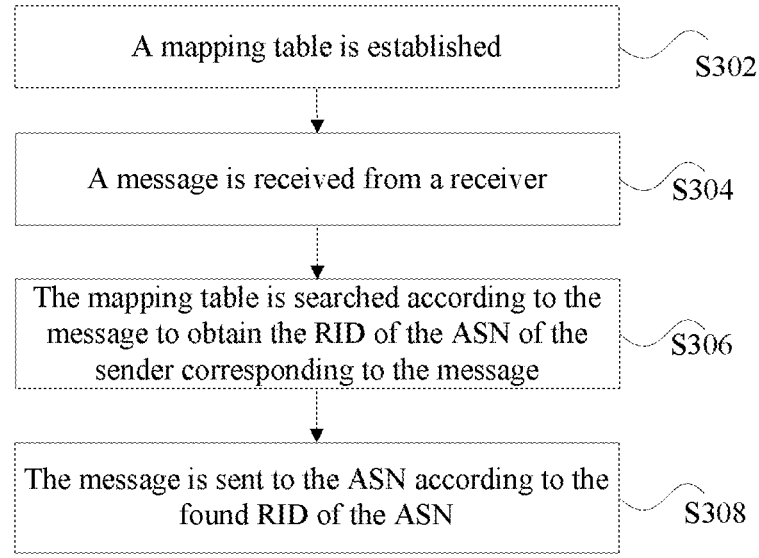
FIG. 3 is a flowchart of a method for sending a message according to an embodiment of the present disclosure.

In the embodiment, a method for sending a message is provided. FIG. 3 is a flowchart of a method for sending a message according to an embodiment of the present disclosure, and as shown in FIG. 3, the flow includes the following steps S302 to S306.

Step S302: a mapping table is established, wherein the mapping table includes a corresponding relationship at least between an RID of an ASN of a sender and an AID, and the AID includes an AID of the sender and an AID of a receiver;

Step S304: a message is received from the receiver;

Step S306: the mapping table is searched according to the message to obtain the RID of the ASN of the sender corresponding to the message; and Step S308: the message is sent to the ASN according to the found RID of the ASN.

By the steps, the mapping table recording the corresponding relationship is established, and by virtue of the corresponding relationship, the RID of the ASN of the sender can be determined, and then the message sent by the receiver can be correctly sent to the ASN of the sender. In this way, the problem of non-uniformity of access manners for uplink and downlink data streams in the related technology is solved, and a proper access manner can be selected for the downlink data stream.

In the embodiment, the establishment of the mapping table may be completed in the ASN of the sender, or in an ASN of the receiver according to the message of the sender. The two example implementation modes are respectively described below.

Example implementation mode 1: the mapping table is established in the ASN of the receiver.

In the example implementation mode, the ASN of the receiver receives a message from the sender through the ASN of the sender, extracts the AID of the sender, the AID of the receiver and the RID of the ASN of the sender from the message of the sender, and establishes the corresponding relationship; the ASN of the receiver receives a message from the receiver; the ASN of the receiver searches the mapping table for the RID of the ASN of the sender corresponding to the message of the receiver according to the message of the receiver; and the ASN of the receiver sends the message of the receiver to the ASN of the sender according to the found RID of the ASN of the sender.

By the example implementation mode, it is unnecessary to change the ASN of the sender, and only the ASN of the receiver is processed.

Example implementation mode 2: the mapping table is established in the ASN of the sender.

There may be multiple ASNs corresponding to the sender, for example, one ASN may be selected as a primary ASN (called a first ASN in the example implementation mode), and if the message is sent to the receiver through another ASN (called a second ASN in the example implementation mode), when the receiver sends a message to the sender, the primary ASN forwards the message to the another ASN under the condition that the message is first sent to the primary ASN.

In the example implementation mode, the first ASN corresponding to the sender receives the message from the sender through the second ASN corresponding to the sender, extracts the AID of the sender, the AID of the receiver and an RID of the second ASN from the message of the sender, and establishes the corresponding relationship; the first ASN receives a message from the receiver; the first ASN searches the mapping table for the RID of the second ASN corresponding to the message of the receiver according to the message of the receiver; and the first ASN sends the message of the receiver to the second ASN according to the found RID of the second ASN.

By the example implementation mode, it is unnecessary to make any change in the ASN of the receiver, and only the ASN of the sender is changed.

In the example implementation mode, the primary ASN may be specified by a network side, that is, the first ASN receives a notification from the network side, wherein the notification is used for indicating that the first ASN is a primary ASN; and the first ASN initiates establishment of a tunnel to the second ASN according to the RID of the second ASN carried in the notification, wherein the tunnel is used for interaction between the first ASN and the second ASN. Or, the primary ASN is determined by negotiation between the ASNs, that is, the first ASN and the second ASN receive a notification from the network side, and the first ASN and the second ASN establish a tunnel, wherein the tunnel is used for interaction between the first ASN and the second ASN; and the first ASN and the second ASN negotiate about a primary and secondary relationship between the first ASN and the second ASN, and return a negotiation result to the network side.

It is important to note that the two embodiments may be used independently, and may also be combined for use.

In the embodiments and the example implementation modes, if messages from different ports of the same sender and/or receiver need to be distinguished, the corresponding relationship may be a corresponding relationship between the RID of the ASN of the sender, the AID and a port number, wherein the port number includes a port number of the receiver and/or a port number of the sender.

Figure 4:
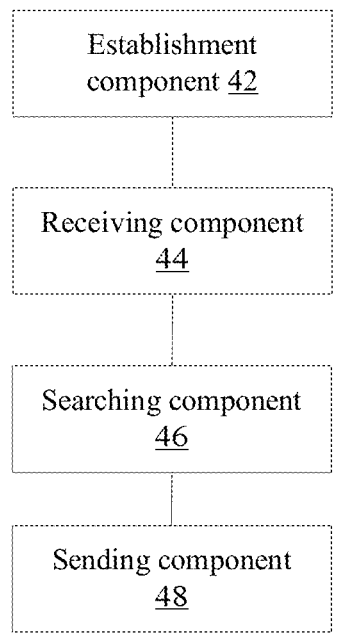
FIG. 4 is a structure diagram of a device for sending a message according to an embodiment of the present disclosure.

In the embodiment, a device for sending a message is further provided. The device for sending a message is configured to implement the abovementioned method, and that what has been described in the embodiments and the example implementation modes will not be repeated here. It is important to note that names of components in the device do not form actual limits to the components, for example, an establishment component may be described as "means configured to establish a mapping table", and all of the following components may be implemented in a processor, for example, the establishment component may be described as "a processor configured to establish the mapping table", or "a processor, including the establishment component" and the like. FIG. 4 is a structure diagram of a device for sending a message according to an embodiment of the present disclosure. As shown in FIG. 4, the device includes: an establishment component 42, a receiving component 44, a searching component 46 and a sending component 48. The device is described below.

The establishment component 42 is configured to establish a mapping table, wherein the mapping table includes a corresponding relationship at least between an RID of an ASN of a sender and an AID, and the AID includes an AID of the sender and an AID of a receiver;

the receiving component 44 is configured to receive a message from the receiver;

the searching component 46 is configured to search the mapping table for the RID of the ASN of the sender corresponding to the message according to the message; and the sending component 48 is configured to send the message to the ASN according to the found RID of the ASN.

According to the device, the establishment component 42 is configured to establish the mapping table, wherein the mapping table includes the corresponding relationship at least between the RID of the ASN of the sender and the AID, and the AID includes the AID of the sender and the AID of a receiver; the receiving component 44 is configured to receive a message from the receiver; the searching component 46 is configured to search the mapping table for the RID of the ASN of the sender corresponding to the message according to the message; and the sending component 48 is configured to send the message to the ASN according to the found RID of the ASN. By virtue of the device, the problem of non-uniformity of access manners for uplink and downlink data streams in the related technology is solved, and a proper access manner can be selected for the downlink data stream.

In the embodiment, the device for sending a message may be located in an ASN of the receiver, and the establishment component 42 is configured to receive a message from the sender through the ASN of the sender, extract the AID of the sender, the AID of the receiver and the RID of the ASN of the sender from the message of the sender, and establish the corresponding relationship; the receiving component 44 is configured to receive a message from the receiver; the searching component 46 is configured to search the mapping table for the RID of the ASN of the sender corresponding to the message of the receiver according to the message of the receiver; and the sending component 48 is configured to send the message of the receiver to the ASN of the sender according to the found RID of the ASN of the sender.

In the embodiment, the device for sending a message may be located in a first ASN corresponding to the sender, and the establishment component 22 is configured to receive a message from the sender through a second ASN corresponding to the sender, extract the AID of the sender, the AID of the receiver and an RID of the second ASN from the message of the sender, and establish the corresponding relationship; the receiving component 24 is configured to receive a message from the receiver; the searching component 26 is configured to search the mapping table for the RID of the second ASN corresponding to the message of the receiver according to the message of the receiver; and the sending component 28 is configured to send the message of the receiver to the second ASN according to the found RID of the second ASN.

The present disclosure is described below with reference to example embodiments and example implementation modes.

Example Embodiment 1

The example embodiment of the present disclosure provides a method for implementing multiple access manners in an identifier and locator separation technology. The method may include two solutions respectively described as follows.

Solution 1: an ASN of a receiver is changed, and a local ASN remains unchanged.

The ASN of the receiver learns/records a binding corresponding relationship among an AID of a sender, an AID of the receiver, port information of the receiver and/or the sender and an RID of the sender (i.e. an RID of an ASN of the sender).

When the ASN of the receiver receives a data message from the receiver, the RID of the sender can be obtained according to the AID of the sender, the AID of the receiver and/or the port information carried in the data message, wherein the port information refers to the port information of the receiver and/or the sender, and then sends the data message to the opposite end.

Solution 2: the local ASN is changed, and the opposite ASN remains unchanged.

An ILR at the network side discovers multiple access of a user, notifies two access points to establish a forwarding tunnel, and specifies one ASN to locally establish a forwarding strategy table, wherein the forwarding strategy table refers to that a data message received by the ASN is required to be forwarded to the other ASN through the forwarding tunnel according to a forwarding strategy.

After the ASN of the receiver receives a message, the ASN queries and acquires an RID from the ILR, and the ILR returns the RID of the specified ASN.

The ASN of the receiver sends the data message to the specified ASN, and this specified ASN selects to send the data message to be forwarded to the other ASN through the forwarding tunnel according to the forwarding strategy.

In this solution, the forwarding strategy table includes an AID of a sender, an AID of the receiver, port information of the receiver and/or the sender, and an RID of the ASN at the opposite end of the forwarding tunnel.

Example Embodiment 2

In the example embodiment, after a user accesses a network in multiple access manners, for example, simultaneously accesses the network in a Wireless Fidelity (WiFi) manner and a 3rd-Generation (3G) manner, the network allocates the same AID to the user, but RIDs of ASNs are different.

Figure 5:
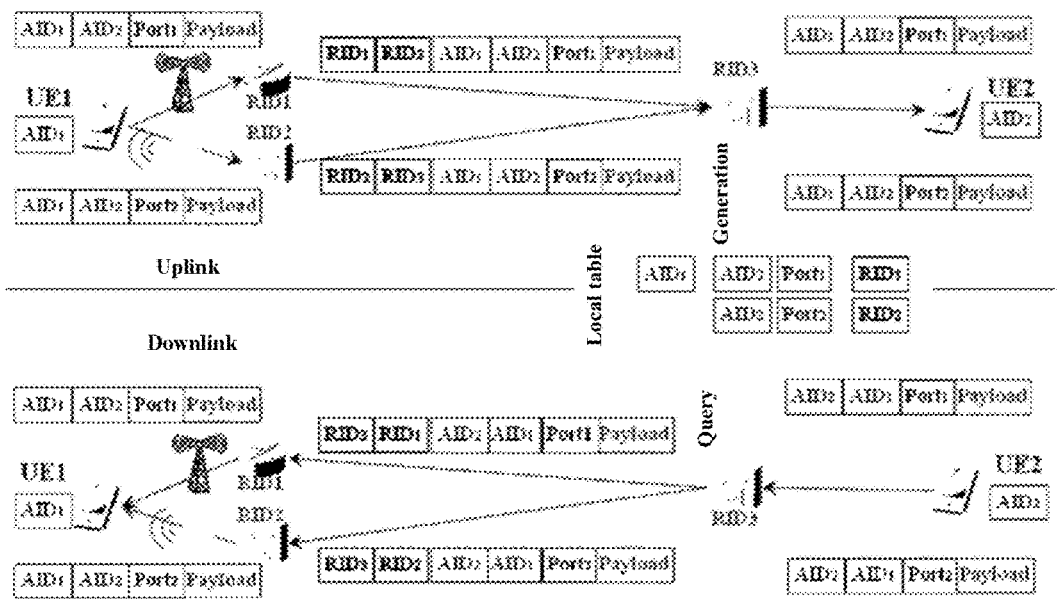
FIG. 5 is a diagram of establishment and searching of a local mapping table according to an example embodiment of the present disclosure.

FIG. 5 is a diagram of establishment and searching of a local mapping table according to an example embodiment of the present disclosure. As shown in FIG. 5, UE1 sends a data message to an opposite ASN, the opposite ASN3 (identified with RID3) extracts an AID of a sender, an AID of a receiver, port information of the sender and/or the receiver and an RID of the sender from the message, and generates a local table. When UE2 sends a data message to UE1, the data message reaches opposite ASN3 at first, ASN3 queries the local table according to the AID of the sender, the AID of the receiver and the port information of the sender and/or the receiver to obtain the RID of the sender, and sends the data message to opposite ASN1 or ASN2 after encapsulating the data message using the RID.

Figure 6:
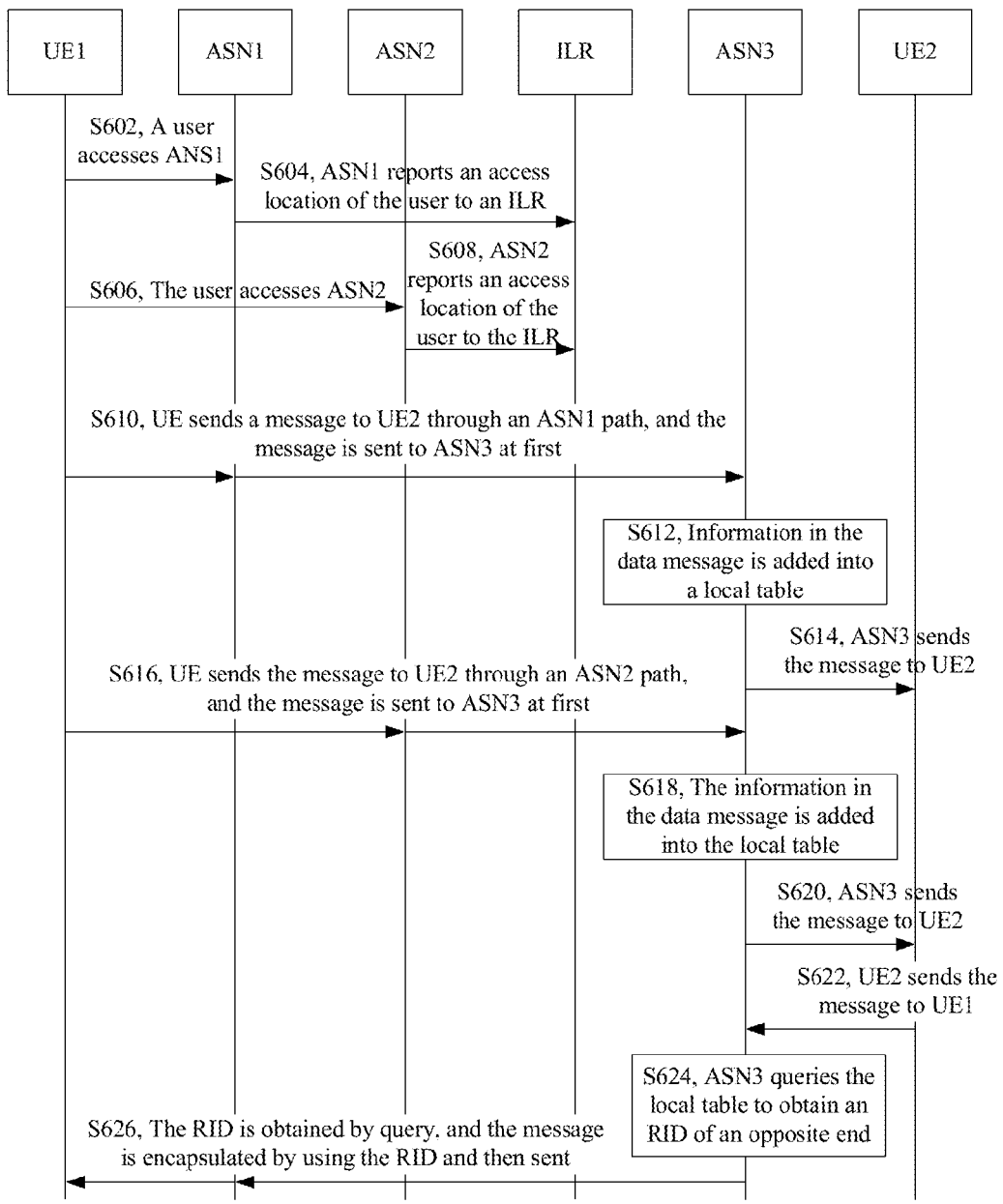
FIG. 6 is a flowchart of establishment and searching of a local mapping table according to another example embodiment of the present disclosure.

FIG. 6 is a flowchart of establishment and searching of a local mapping table according to an example embodiment of the present disclosure. As shown in FIG. 6, the specific flow is as follows.

Step S602: a user accesses ASN1 (for example: 3G cellular access), and a network allocates AID1 to the user;

Step S604: ASN1 reports an access location of the user (RID1 of ASN1) to an ILR, and the ILR stores a mapping relationship between the AID of the user and the RID;

Step S606: the user accesses ASN2 (for example: WiFi wireless access), the network allocates AID1 to the user, that is, the same AID is allocated to the user when the user accesses the network in different access manners;

Step S608: ASN2 reports the access allocation of the user (RID2 of ASN2) to the ILR, and the ILR stores the mapping relationship between the AID of the user and the RID;

Step S610: UE sends a data message to UE2 through an ASN1 path (in a 3G cellular wireless access manner), wherein the data message is sent to ASN3 of UE2 at first;

Step S612: information in the data message is added into a local table, and ASN3 learns/records a mapping relationship among AID1 of a sender, AID2 of a receiver, port information of the sender and/or the receiver and RID1 of the ASN of the sender, wherein the mapping relationship can be queried when a data message is received from UE2 so that the data message can then be sent to the opposite ASN;

Step S614: ASN3 sends a data message to opposite UE2;

Step S616: the UE sends the data message to UE2 through an ASN2 path (in a WiFi wireless access manner), wherein the data message is sent to ASN3 of UE2 at first;

Step S618: information in the data message is added into the local table, and ASN3 learns/records a mapping relationship among AID1 of the sender, AID2 of the receiver, port information of the sender and/or the receiver and RID2 of the ASN of the sender;

Step S620: ASN3 sends the data message to opposite UE2;

Step S622: UE2 sends a data message to UE1, ASN3 queries an RID of UE1 from the ILR, the ILR returns multiple access information of the user (for example, returns RID1 and RID2), and ASN3 does not know to which ASN should the message be sent;

Step S624: ASN3 locally queries the local table to acquire an RID of the opposite end, and acquires the RID of the user, for example, RID1, on the basis of the DI of the sender, the AID of the receiver and the port information of the sender and/or the receiver carried in the data message; and Step S626: the message is encapsulated using the RID obtained by query and then sent, specifically, ASN3 encapsulates the message by adopting RID1, and then sends the message to ASN1, and ASN1 forwards the message to UE1.

By the steps, the embodiment of the present disclosure solves the problem of non-uniformity of access manners for uplink and downlink data streams, and improves the continuity of a user network service.

Example Embodiment 3

In the example embodiment, after a user accesses a network in multiple access manners, for example, simultaneously accesses the network in a WiFi manner and a 3G manner, the network allocates the same AID to the user, but RIDs of ASNs are different.

Figure 7:
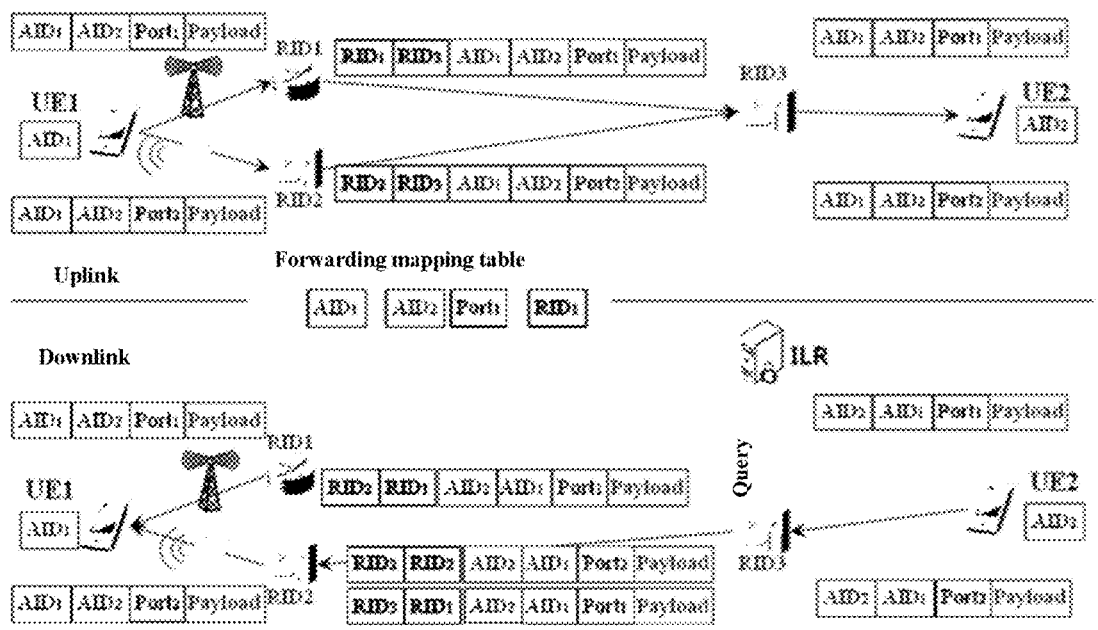
FIG. 7 is a diagram of generation of a forwarding mapping table according to an example embodiment of the present disclosure.

FIG. 7 is a diagram of generation of a forwarding mapping table according to an example embodiment of the present disclosure. As shown in FIG. 7, for example, an ILR learns about that a user has two RIDs for access, one corresponds to an ASN identifier for a 3G cellular network, and the other corresponds to an ASN identifier for WiFi wireless access. A network notifies the two ASNs to establish a forwarding tunnel, a forwarding mapping table is further established on one ASN (for example, the one ASN is selected on the basis of a load sharing principle), and when the ASN receives a data message consistent with the mapping table, the data message is sent to the other ASN through the forwarding tunnel. In this example embodiment, the forwarding mapping table includes an AID of a sender, an AID of a receiver, port information of the sender and/or the receiver and/or an RID of an ASN at the opposite end of the forwarding tunnel.

When UE2 sends a data message to UE1, the data message reaches opposite ASN3 at first, ASN3 queries an RID of UE1 from the ILR, the ILR returns the RID of the ASN on which the forwarding mapping table is established, ASN3 encapsulates the message according to the returned RID, and sends the message to the opposite ASN, and after the ASN receives the data message, the ASN queries the local forwarding mapping table, and sends data to be forwarded to the ASN of the other end through a forwarding tunnel, and this ASN sends the data message to UE1.

Figure 8:
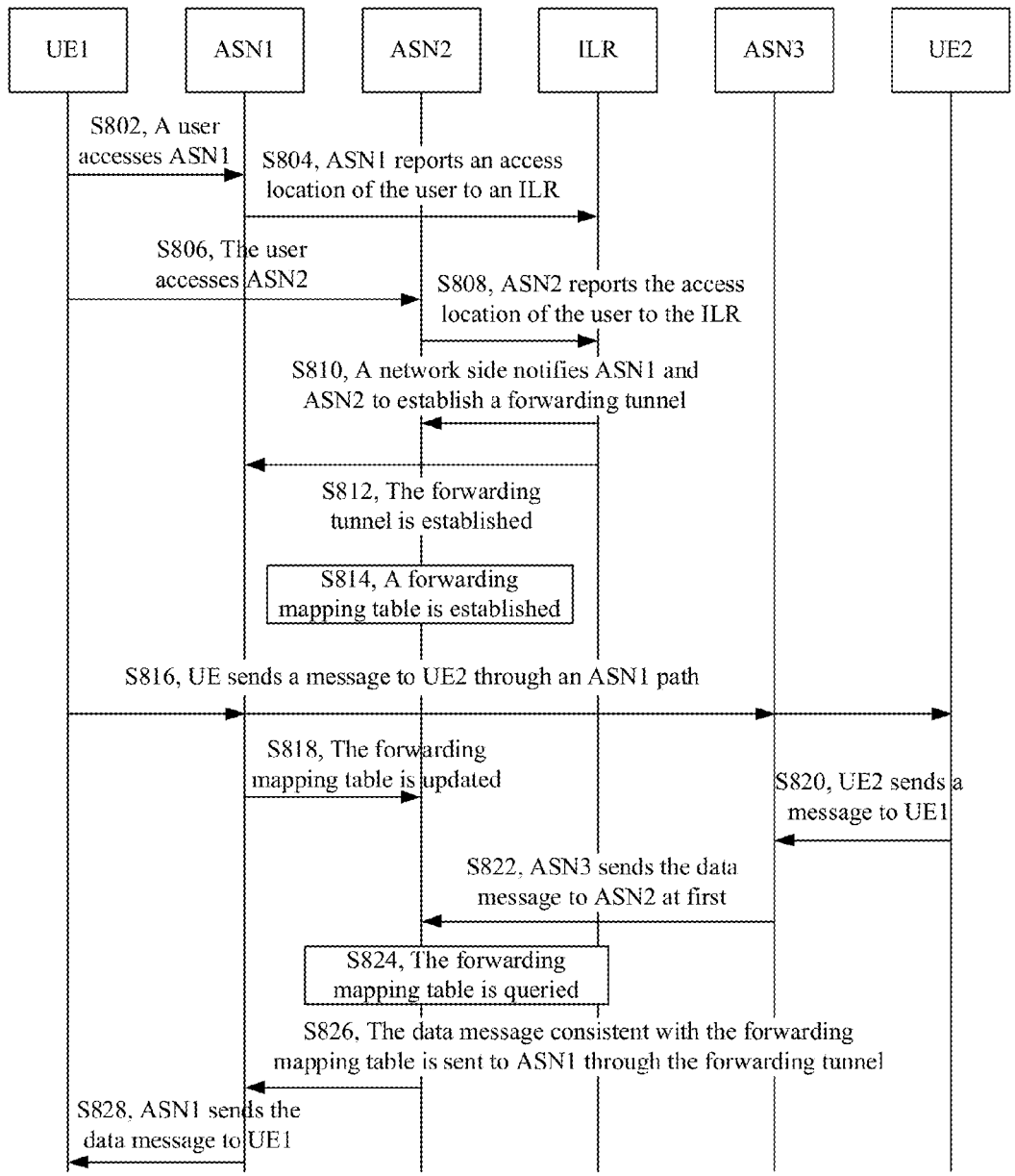
FIG. 8 is a flowchart of generation of a forwarding mapping table according to another example embodiment of the present disclosure.

FIG. 8 is a flowchart of establishment and searching of a forwarding mapping table according to an example embodiment of the present disclosure. As shown in FIG. 8, the specific implementation flow is as follows.

Step S802: a user accesses a network through ASN1 (for example: 3G cellular access), and the network allocates AID1 to the user;

Step S804: ASN1 reports an access location of the user (RID1 of ASN1) to an ILR, and the ILR stores a mapping relationship between the AID of the user and the RID;

Step S806: the user accesses the network through ASN2 (for example: WiFi wireless access), the network allocates AID1 to the user, that is, the same AID is allocated to the user when the user accesses the network in different access manners;

Step S808: ASN2 reports the access allocation of the user (RID2 of ASN2) to the ILR, and the ILR stores the mapping relationship between the AID of the user and the RID;

Step S810: a network side establishes a forwarding tunnel through ASN1 and ASN2, wherein the network side (for example, the ILR) senses that the user accesses the network in multiple access manners, and determines that it is needed to establish the forwarding tunnel;

Step S812: the forwarding tunnel is established, the network side (for example, the ILR) selects one ASN as a primary ASN, and may notify one ASN (for example, the primary ASN) with the RID of the ASN of the other end, and the notified ASN initiates the establishment of the tunnel to the other ASN, or the network side simultaneously notifies the two ASNs to establish the tunnel, and then the two ASNs negotiates about a primary and secondary relationship between the first ASN and the second ASN, and return a result to the ILR;

Step S814: the forwarding mapping table is established, for example, the primary ASN establishes the forwarding mapping table, wherein the mapping table includes an AID of a sender, an AID of a receiver, port information of the sender and/or the receiver and/or an RID of an ASN at the opposite end of the tunnel (the tunnel is used for end-to-end communication, and if the matching of AID and port can be done successfully, a data message can be sent to the opposite end directly through the tunnel);

Step S816: UE sends a data message to UE2 through an ASN1 path (in a 3G cellular wireless access manner), wherein the data message is sent to ASN3 of UE2 at first;

Step S818: the forwarding mapping table is updated, ASN1, as a non-primary ASN, acquires data sent by the user, if downlink data is also required to be returned from ASN1, then the primary ASN (i.e. ASN2) is notified to establish the forwarding mapping table, wherein the notification may carry the AID of the sender, the AID of the receiver and the port information of the sender and/or the receiver, and the primary ASN establishes the forwarding mapping table after receiving the message;

Step S820: UE2 sends a data message to UE1, ASN3 queries an RID of UE1 from the ILR, and the ILR returns the RID of the primary ASN, for example, the RID of ASN2;

Step S822: ASN encapsulates the message by adopting RID2, and sends the message to ASN2;

Step S824: ASN2 queries the local forwarding mapping table, and performs matching according to the AID of the sender, the AID of the receiver and the port information of the sender and/or the receiver;

Step S826: the data message consistent with the forwarding mapping table is sent to ASN1 through the forwarding table; and Step S828: ASN1 forwards the data message to UE1.

INDUSTRIAL APPLICABILITY

By the embodiments of the present disclosure, a mapping table is established, and a message is received from a receiver; the mapping table is searched according to the message to obtain the RID of the ASN of the sender corresponding to the message; and the message is sent to the ASN according to the found RID of the ASN. By virtue of the technical solution, the problem of non-uniformity of access manners for uplink and downlink data streams in the related technology is solved, and a proper access manner can be selected for the downlink data stream.

Obvious, those skilled in the art should know that each component or step of the present disclosure may be implemented by a universal computing device, and the components or steps may be concentrated on a single computing device or distributed on a network formed by at least two computing devices, and may optionally be implemented by programmable codes executable for the computing devices, so that the components or steps may be stored in a storage device for execution with the computing devices, or may form each integrated circuit component, or at least two components or steps therein may form a single integrated circuit component for implementation. As a consequence, the present disclosure is not limited to any specific hardware and software combination.

The above is only the example embodiment of the present disclosure and not intended to limit the present disclosure, and for those skilled in the art, the present disclosure may have various modifications and variations. Any modifications, equivalent replacements, improvements and the like within the principle of the present disclosure shall fall within the scope of protection defined by the claims of the present disclosure.

What is claimed is:

1. A method for sending a message, comprising:
    establishing a mapping table, wherein the mapping table comprises a corresponding relationship at least between a Route Identification (RID) of an Access Service Node (ASN) of a sender and an Access Identification (AID), and the AID comprises an AID of the sender and an AID of a receiver;
    receiving a message from the receiver;
    searching the mapping table for the RID of the ASN of the sender corresponding to the message according to the message;
    sending the message to the ASN according to the found RID of the ASN;
    a first ASN corresponding to the sender receives a message from the sender through a second ASN corresponding to the sender, extracts the AID of the sender, the AID of the receiver and an RID of the second ASN from the message of the sender, and establishes the corresponding relationship;
    the first ASN receives a message from the receiver;
    the first ASN searches the mapping table for the RID of the second ASN corresponding to the message of the receiver according to the message of the receiver; and
    the first ASN sends the message of the receiver to the second ASN according to the found RID of the second ASN, wherein the corresponding relationship is a corresponding relationship between the RID of the ASN of the sender, the AID and a port number, and the port number comprises a port number of the receiver and/or a port number of the sender.

2. The method as claimed in claim 1, wherein
    an ASN of the receiver receives a message from the sender through the ASN of the sender, extracts the AID of the sender, the AID of the receiver and the RID of the ASN of the sender from the message of the sender, and establishes the corresponding relationship;
    the ASN of the receiver receives a message from the receiver;
    the ASN of the receiver searches the mapping table for the RID of the ASN of the sender corresponding to the message of the receiver according to the message of the receiver; and
    the ASN of the receiver sends the message of the receiver to the ASN of the sender according to the found RID of the ASN of the sender.

3. The method as claimed in claim 2, wherein the corresponding relationship is a corresponding relationship between the RID of the ASN of the sender, the AID and a port number, and the port number comprises a port number of the receiver and/or a port number of the sender.

4. The method as claimed in claim 1, wherein before the first ASN receives the message from the sender through the second ASN, the method further comprises:
    receiving, by the first ASN, a notification from a network side, wherein the notification is used for indicating that the first ASN is a primary ASN; and
    initiating, by the first ASN, establishment of a tunnel to the second ASN according to the RID of the second ASN carried in the notification, wherein the tunnel is used for interaction between the first ASN and the second ASN.

5. The method as claimed in claim 4, wherein the corresponding relationship is a corresponding relationship between the RID of the ASN of the sender, the AID and a port number, and the port number comprises a port number of the receiver and/or a port number of the sender.

6. The method as claimed in claim 1, wherein before the first ASN receives the message from the sender through the second ASN, the method further comprises:
    receiving, by the first ASN and the second ASN, a notification from the network side, and establishing, by the first ASN and the second ASN, a tunnel, wherein the tunnel is used for interaction between the first ASN and the second ASN; and
    negotiating, by the first ASN and the second ASN, about a primary and secondary relationship between the first ASN and the second ASN, and returning a negotiation result to the network side.

7. The method as claimed in claim 6, wherein the corresponding relationship is a corresponding relationship between the RID of the ASN of the sender, the AID and a port number, and the port number comprises a port number of the receiver and/or a port number of the sender.

8. The method as claimed in claim 1, wherein the corresponding relationship is a corresponding relationship between the RID of the ASN of the sender, the AID and a port number, and the port number comprises a port number of the receiver and/or a port number of the sender.

9. A device for sending a message, comprising:
an establishment component, configured to establish a mapping table, wherein the mapping table comprises a corresponding relationship at least between a Route Identification (RID) of an Access Service Node (ASN) of a sender and an Access Identification (AID), and the AID comprises an AID of the sender and an AID of a receiver;
a receiving component, configured to receive a message from the receiver;
a searching component, configured to search the mapping table for the RID of the ASN of the sender corresponding to the message according to the message;
a sending component, configured to send the message to the ASN according to the found RID of the ASN; a processor;
a hardware interface;
the establishment component is configured to receive a message from the sender through a second ASN corresponding to the sender, extract the AID of the sender, the AID of the receiver and an RID of the second ASN from the message of the sender, and establish the corresponding relationship;
the receiving component is configured to receive a message from the receiver;
the searching component is configured to search the mapping table for the RID of the second ASN corresponding to the message of the receiver according to the message of the receiver; and
the sending component is configured to send the message of the receiver to the second ASN according to the found RID of the second ASN, wherein the corresponding relationship is a corresponding relationship between the RID of the ASN of the sender, the AID and a port number, and the port number comprises a port number of the receiver and/or a port number of the sender.

10. The device as claimed in claim 9, wherein the device is located in an ASN of the receiver, and
the establishment component is configured to receive a message from the sender through the ASN of the sender, extract the AID of the sender, the AID of the receiver and the RID of the ASN of the sender from the message of the sender, and establish the corresponding relationship;
the receiving component is configured to receive a message from the receiver;
the searching component is configured to search the mapping table for the RID of the ASN of the sender corresponding to the message of the receiver according to the message of the receiver; and
the sending component is configured to send the message of the receiver to the ASN of the sender according to the found RID of the ASN of the sender.

11. The device as claimed in claim 10, wherein the corresponding relationship is a corresponding relationship between the RID of the ASN of the sender, the AID and a port number, and the port number comprises a port number of the receiver and/or a port number of the sender.

12. The device as claimed in claim 9, wherein the corresponding relationship is a corresponding relationship between the RID of the ASN of the sender, the AID and a port number, and the port number comprises a port number of the receiver and/or a port number of the sender.

* * * * *